United States Patent [19]

Langley

[11] Patent Number: 4,661,249
[45] Date of Patent: Apr. 28, 1987

[54] PREFILTER DEVICE FOR POLYMERIC MATERIAL

[75] Inventor: Isaac L. Langley, Greenville, S.C.

[73] Assignee: Metallurgical Industries, Inc., Tinton Falls, N.J.

[21] Appl. No.: 695,618

[22] Filed: Jan. 28, 1985

[51] Int. Cl.$^4$ .............................................. B01D 29/26
[52] U.S. Cl. .................................... 210/266; 425/199
[58] Field of Search ............ 210/773, 266, 282, 283, 210/287, 289, 291, 500.1, 510.1; 425/197–199

[56] References Cited

U.S. PATENT DOCUMENTS

| | | | |
|---|---|---|---|
| 3,167,399 | 1/1965 | Hansen | 210/266 |
| 3,182,803 | 5/1965 | Chisholm | 210/266 |
| 3,263,812 | 8/1966 | Hartley | 210/266 |
| 3,896,028 | 7/1975 | Phillips | 210/282 |
| 4,077,880 | 3/1978 | Lorenz et al. | 425/199 |
| 4,332,541 | 6/1982 | Anders | 425/199 |

Primary Examiner—Ivars Cintins
Attorney, Agent, or Firm—Kenyon & Kenyon

[57] ABSTRACT

The filter assembly is constructed of outer sleeves of wire screen, a mass of shattered metal particles within the sleeves and at least one tubular filter element within the shattered metal particles. The mass of shattered metal particles serves to remove micro-gels from the polymeric material flowing through the filter assembly while the inner filter element serves to remove particulate matter.

14 Claims, 4 Drawing Figures

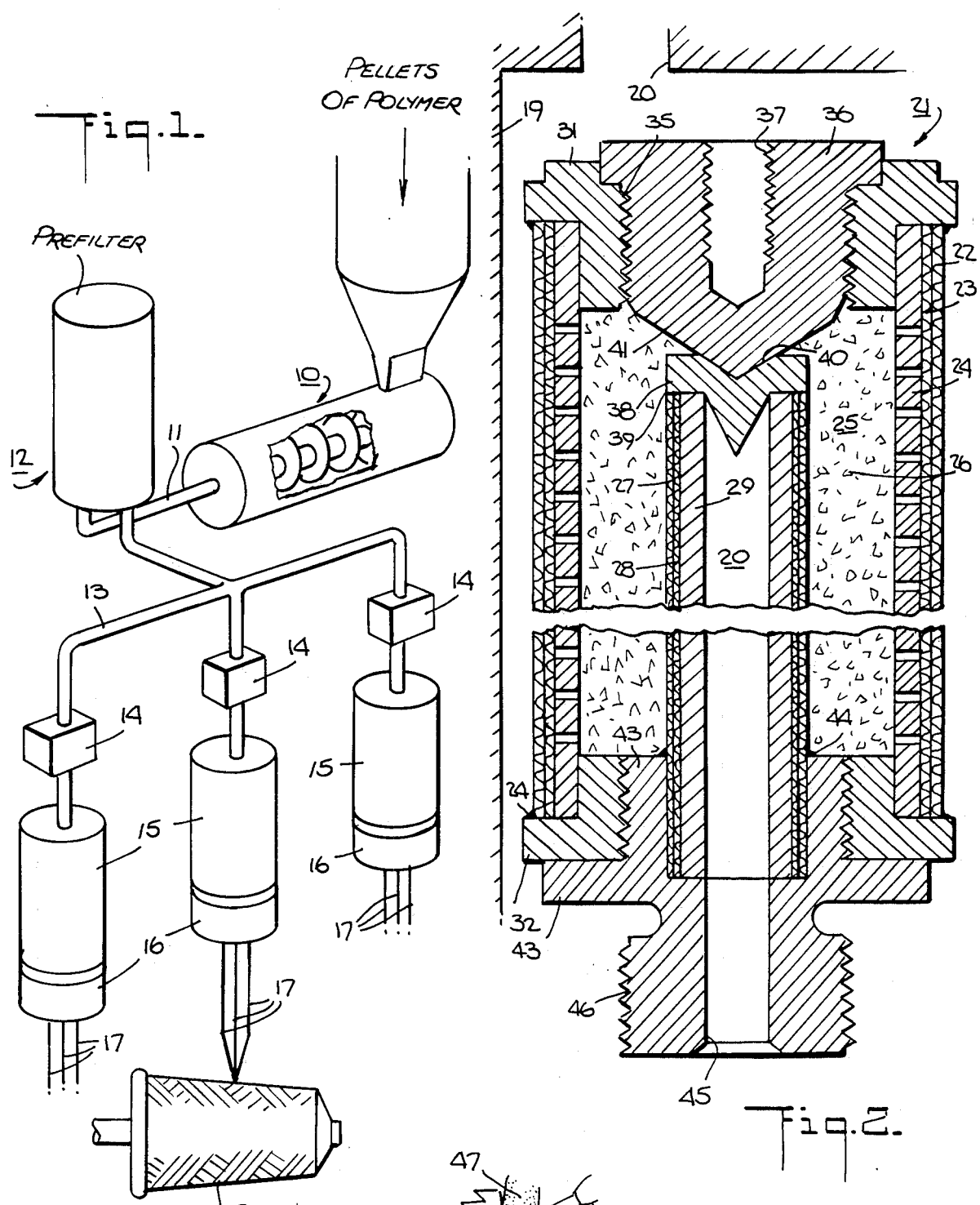

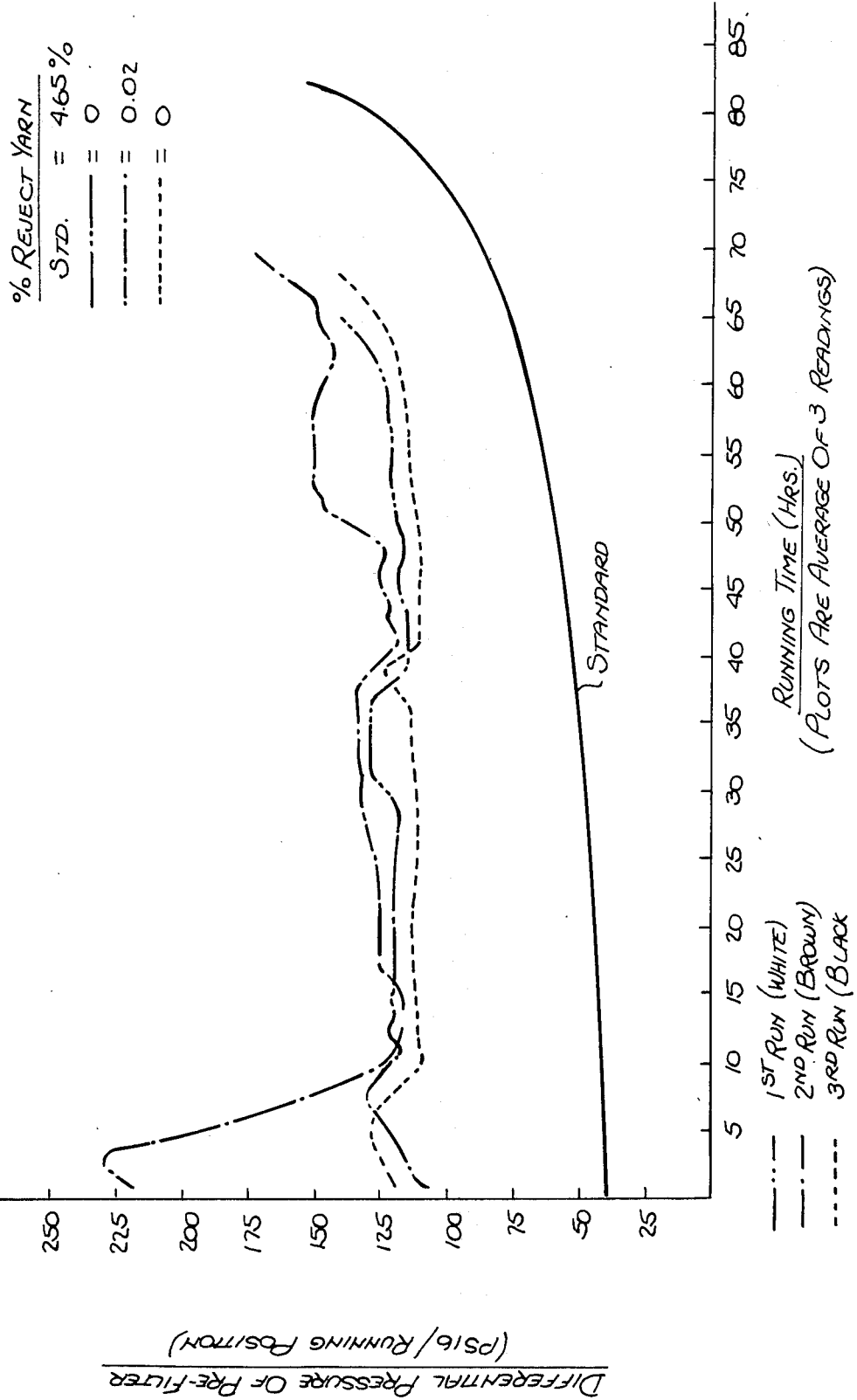

PREFILTER DEVICE FOR POLYMERIC MATERIAL

This invention relates to a pre-filter device for polymeric materials. More particularly, this invention relates to a pre-filter device for filtering polymeric material for the manufacture of multi-filament thread.

Heretofore, various types of systems have been known for the manufacture of mult-filament thread. In many cases, the systems have employed a screw or melt-type extruder from which a stream of high pressure molten polymer is expelled, a pre-filter device, a manifold distribution system to metering pumps and a series of spin pack stations in which the polymer is passed through a filter pack assembly and a spinnerette having very small orifices to form filaments. Generally, such a system is operated so that the extruded polymer is filtered through the pre-filter device so that various large contaminants are removed from the polymer stream prior to passage through the manifold and metering pumps to the filter/spinnerette stations. As is known, the contaminants usually comprise particulate foreign matter, carbonized polymer, cross-linked structures and other polymeric anomalies, commonly called gels.

The filter devices generally used are a variety of felt metal, mesh, sintered powdered metal, perforated metal, screen and wire cloth. In each case, the filter media have been designed to accommodate the specific flow rates and differential pressure required and, within their structure to prohibit the passage of certain sized contaminants. To this end, the major functions for which the filter media have been designed are a minimum residence time for polymer flow, minimal dead space or partially stagnant flow areas, stability within its macro structure and easy containment to prevent vibration of the filter media into the polymer stream.

Shattered metal particles, for example, as described in U.S. Pat. No. 3,896,028, have been known for use in a filter/spinnerette pack assembly which includes a filter body inserted into a spinning block. In this case, the shattered metal particles serve as a filter media immediately prior to passage of the polymer through a screen, and/or a distribution plate and a spinnerette. In cases where sand has been used as the filter media, there are several disadvantages to its use for filtering polymer material. First, the rounded grain structure of sand limits the amount of compaction which can take place in a filter device. As a result, some degree of surface disturbance invariably occurs. Because of this, some degree of channelling of the polymer flow through the sand occurs with varying flow properties during the life of the sand filter media. Second, the residence time of a polymer in a sand filter media is relatively high. As is known, spinning pack filters are generally rather small and are subjected to rather large pressures, for example 5000 psi to 10,000 psi.

It is also known that the degree of compaction of the shattered metal particles in a spinning pack filter is such as to cause the irregular grains of the shattered metal to interlock, forming a vertical pore structure of infinitely varying restrictions and voids that create turbulent, high shear flow. The filtering action is dependent upon the inertial effect of this varying flow velocity which separates particulate from the main polymer stream into blind end cavities where the particulate and micro-gels are inertially prevented from re-entering the same fluid stream. As a result, the particulate or micro-gels would be allowed to pass through the spinnerette orifices.

Porous, sintered metal filters have been described, for example in U.S. Pat. No. 3,570,059, for use in spinnerette pack filters. Generally, such a porous metal filter provides a static filter wherein the voids between the sintered particles of the structure act as static pores. The residence time of a polymer flowing through such a filter is usually more than that of screen, wire cloth or felt metal and particulate retention is positively determined by the pore shape. However, such filters suffer greatly from surface blinding due to polymeric anomalies, such as gels, and large particle retentions. Hence, the life of such filters has been relatively short.

Accordingly, it is an object of the invention to provide a filter assembly which provides both an extremely high shear effect to break up polymeric anomalies and high particulate interruption.

It is another object of the invention to provide a filter assembly of relatively long filter life.

It is another object of the invention to provide a filter which can be easily cleaned.

It is another object of the invention to provide a filter assembly which can be used in a pre-filter device in the manufacture of multi-filament thread.

It is another object of the invention to provide a filter assembly which provides a minimum residence time for a polymer flow yet minimal dead space with easy containment of the filter media to prevent migration of the media into the polymer stream.

Briefly, the invention provides a filter assembly for polymeric material which can be incorporated into a prefilter device for use in a system for the manufacture of multi-filament thread. The filter assembly includes at least one outer tubular porous sleeve for filtering a polymeric material and for defining a chamber to receive a mass of shattered metal particles in the chamber to filter the polymeric material with the particles being sized to shear the polymeric material into a multiplicity of branched streams for breaking down polymer gels, and at least one inner tubular filter element within the chamber to support the shattered metal particles and to filter out fine particulate matter from the polymeric material. In addition, the inner filter element becomes and defines an outlet passage for the filtered polymeric material.

The filter assembly is constructed so as to be readily assembled and disassembled, for example for cleaning purposes. To this end, the filter assembly includes end caps which are secured to opposite ends of the outer sleeve in order to close off the chamber. In addition, a plug is removably mounted in one end cap in order to provide an opening for filling and emptying of the shattered metal particles into and out of the chamber. Further, a fitting is removably mounted in the other end cap and is secured to the inner tubular filter element in order to permit removal of the filter element from the chamber.

In one embodiment, the filter assembly is constructed with three concentric and contiguous sleeves to define the chamber in which the mass of shattered metal particles is placed. Two of these sleeves may be formed of a wire mesh screen and may occupy the outermost positions. The third sleeve which occupies an innermost position for support may be made of a perforated tube in order to retain the wire mesh screens in a stable position.

The filter assembly may also comprise three concentric and contiguous tubular filter elements within the chamber. In this case, each of two of the outer filter elements may be in the form of a wire mesh screen while the third and innermost filter element is in the form of a tube for supporting the wire mesh screens.

The filter assembly can be incorporated into any suitable housing in order to form a pre-filter device for a molten polymeric material. In this case, the housing is constructed with a cavity into which the filter assembly can be removably mounted and an inlet for the introduction of the polymeric material into the cavity for filtration through the assembly.

When incorporated into a system for the manufacture of multi-filament thread, the pre-filter device may be located downstream of an extruder which extrudes a stream of molten polymeric material in order to filter particulate and micro-gels from the molten stream. The polymeric material may then be delivered, for example via a manifold, to a plurality of metering pumps and pack filters downstream of the pre-filter device for further filtering immediately prior to being passed through spinnerettes for the formation of a plurality of polymeric filaments.

Since the shattered metal particles of the filter assembly are in contact with the inner filter elements, the approach or inlet velocity of the polymer stream leaving the mass of shattered metal particles and impinging on the face of each filter element is extremely high. This discourages the "blinding" or clogging of the face of each filter element by polymeric anomalies such as gels in addition to the reduction of such polymer anomalies by virtue of the high shear characteristics of the shattered metal particles.

Further, the use of extended area, low velocity filter elements permits extremely small (i.e. fine) particulate matter which may be elicited from the shattered metal mass to be trapped. The use of extended area, low velocity filter elements also provides an effective filtration for very fine particulate and/or micro-gels which remain in the polymer stream and which might not otherwise be removed by the mass of shattered metal particles because of differential pressure considerations.

Tests have demonstrated that the number of breaks in a polymer thread or discontinuities per unit pound of polymer can be dramatically reduced by the use of the pre-filter device. In this regard, it is noted that an extruded stream of polymer may contain various contaminants such as non-deformable gels, deformable gels and particulate.

Non-deformable gels are generally highly degraded, or carbonized or highly cross-linked, or mineral based, or polymeric material whose shape and size prevents the material from passing through a specified pore dimension.

Deformable gels are those whose degree of cross-linking or chain structure allows the gels to change shape and squeeze through pores smaller than their total volume would indicate. By their higher velocity and inertial stagnation, these deformable gels tend to selectively recombine or agglomerate after passing through the orifices of a spinnerette. Hence, these gels cause most of the visible problems blamed on poor filtration. When these deformable gels are included in a filament, being sometimes called micro-gels to distinguish from the larger gels that "plate out" on the surface of a barrier filter, the filament tends to draw on the downstream end and prematurely breaks.

Particulate consists of any non-polymeric material that is larger than those metallic and mineral additives required by the end use of the material, i.e. fiber or film. In fiber extrusion, the particulate is, as a rule of thumb, smaller than 1/11th the diameter of the final filament. However, this does not apply to high speed extrusion processes that incorporate high extrusion/quenching velocities than previously used processes and wherein the undrawn (molten) threadline is compensated for by the use of lower porosity filter media. Other than the normal carbonized polymer, most particulate comes from agglomerated or twinned crystalline additives such as titanium dioxide.

These and other objects and advantages of the invention will become more apparent from the following detailed description taken in conjunction with the accompanying drawings wherein:

FIG. 1 schematically illustrates a system employing a pre-filter device according to the invention for the manufacture of multi-filament thread;

FIG. 2 illustrates a cross-sectional view of a filter assembly constructed in accordance with the invention;

FIG. 3 illustrates a schematic representation of the flow of polymer through the shattered metal particles used in the filter assembly in accordance with the invention; and FIG. 4 graphically illustrates test comparisons of yarn quality between a standard pre-filter and a pre-filter device constructed with shattered metal particles.

Referring to FIG. 1, the system for manufacturing a synthetic polymer thread includes an extruder 10 for extruding at least one stream 11 of molten polymeric material, a pre-filter device 12 downstream of the extruder 10 for filtering particulate and micro-gels from the molten stream 11, a manifold or distribution system 13, a plurality of positive displacement metering pumps 14 and a plurality of pack filters 15 for receiving individual branch streams of the filtered polymeric material.

Further, the system has a plurality of spinnerettes 16, each of which is disposed downstream of a respective pack filter 15 to receive a branch stream of filtered polymeric material for forming a plurality of filaments 17 which can be subsequently wound onto a bobbin or the like to form a thread package 18.

Referring to FIG. 2, the pre-filter device 12 includes a housing 19 which defines a cavity and which has an inlet 20 for the introduction of a polymeric material into the cavity. In addition, the pre-filter device 12 has a filter assembly 21 removably mounted in the housing 19 within the cavity in order to filter the polymeric material.

As indicated, the filter assembly 21 also includes one or more tubular porous sleeves e.g. three sleeves 22, 23, 24 which define a chamber 25 in which a mass 26 of loose shattered metal particles is disposed. In addition, the filter assembly 21 has one or more inner tubular filter elements 27, 28, 29 within the chamber 25 and mass 26 of shattered metal particles to not only support the shattered metal particles but also to filter out smaller particulate matter from the polymeric material. As indicated, the innermost sleeve 29 forms a support and an outlet passage 30 to deliver the filtered polymeric material therethrough.

The sleeves 22, 23, 24 can be made of suitable materials or combinations of materials for filtering and support purposes. For example, the two outermost sleeves 22, 23 may be made of wire mesh screen. For example, the outermost screen may be a 150×150 mesh while the inner screen 23 is made of 20×20 mesh or 150×150 mesh. The innermost sleeve 24 is constructed so as to support the wire mesh screens 22, 23 and to provide rigidity. To this end, the innermost sleeve 24 may be made of perforated plate or a drilled tube.

The mass 26 of shattered metal particles may be made of a composition, for example as described in U.S. Pat. No. 4,166,736 or of any other suitable composition. In any event, as indicated in FIG. 3, the metal particles are sized to shear individual streams of the polymeric material flowing therethrough into a multiplicity of branch streams for breaking down polymer gels in the individual streams. For example, the particles may be sized to pass through a 30 mesh sieve while being retained on a 60 mesh sieve. Alternatively, the size of the particles may be such as to pass through a 40 mesh sieve while being retained on a 80 mesh sieve.

The inner filter elements 27, 28, 29 may be such that the two outermost elements 27, 28 are made of mesh wire screen while the innermost sleeve 29 is made of a wedge wire tube, for example having slots of 0.01 inches. Alternatively, a single sintered metal tube having porosity of 80 microns may be used.

The filter assembly 21 also has a pair of end caps 31, 32 to close off the cavity 25. As indicated the end caps 31, 32 are secured to the innermost sleeve 24 as by welds 33, 34. In addition, the upper end cap 31, as viewed, is provided with a threaded opening 35 into which a threaded plug 36 is removably mounted. The plug 36 is also provided with a tapped bore 37 for locating and centering the unit in the housing 19.

As indicated in FIG. 2, a cap 38 is secured to the inner tubular filter elements 27, 28, 29, as by a weld 39 between the outermost filter 27 and the cap 38. This cap 38 serves to close off the free end of each inner filter element 27, 28, 29 while also having a recess 40 to receive a protuberance 41 on the plug 36. The recess 40 and the protuberance 41 serve to center the sleeves 27, 28, 29 within the cavity 25.

As shown in FIG. 2, the end cap 32 at the bottom end of the filter assembly 21, as viewed, has a threaded opening 42 to receive a threaded fitting 43 in removable manner. This fitting 43 is further counterbored to receive the inner filter elements 27, 28, 29 and is secured as by a weld 44 to the outermost surface of filter element 27. Further, the fitting 43 has a bore 45 coaxial of the outlet passage 30 defined by the innermost filter element 29 and is provided with a thread 46 for threading into a suitable means such as a pipeline or tube sheet (not shown) for delivering the filtered polyermic material to the pump 15 (see FIG. 1).

In operation, the extruder 10 delivers a flow of polymer 11 to the inlet opening 20 of the pre-filter device 12 (FIG. 2). The polymeric material then flows circumferentially around the filter assembly 21 and passes transversely through the outer filter material 22, 23 and support medium 26. At this time, large particulate particles are filtered out of the polymeric material and trapped in the screens 22, 23.

The polymeric material then continues to flow into the mass 26 of shattered metal particles. During this time, individual streams 47 (see FIG. 3) of the polymer are broken down into branch streams 48 where due to the shearing action caused by the passage of polymer through the mass of individual shattered metal particles gels which may exist within the individual streams 47 are reduced in size. In addition, any micro-gels in the polymer become trapped in the voids within the shattered metal particle mass 26 due to the inertial forces.

The polymeric material then passes transversely through the inner filter elements 27, 28 and the support tube 29 into the outlet passage 30. At this point, various small particulate is filtered out of the polymeric material. The resulting filtered polymeric material then passes from the outlet passage 30 through the bore 45 of the fitting 43 to the pump 14 (see FIG. 1).

Referring to FIG. 4 a filter assembly employing shattered metal particles was constructed and tested relative to a standard pre-filter device. In this regard, the shattered metal pre-filter device was constructed as follows:

An outer tube of perforated metal was wrapped within two layers of 150×150 mesh screen wire cloth. An inner tube of 80 micron sintered metal welded to an end cap was plugged at the base end and positioned within the outer tube to define a concentric cavity which was filled with 40/80 sieve shattered metal. An end cap closed the base.

The standard prefilter device was constructed as follows:

A screen wire cloth sandwich of 80×80 mesh screen, 44 micron porosity felt metal and 200×200 mesh screen was fabricated with folded pleats to provide an extended surface area and fastened at either end with suitable end caps and welded in place.

Using a system as described above for producing multi-filament yarn, a test yarn was drawn at a 4.31 ratio. The test yarn from the shattered metal pre-filter device exhibits "zero" breaks as as compared with 0.15 to 0.30 breaks per pound of standard yarn produced using the standard pre-filter device.

The normal pressure drop across the standard pre-filter was approximately 42 psi differential when running at 18.5 pounds per hour with a Nylon 6 polymeric material. A pressure of 600 psi was maintained on the downstream side of the pre-filter. The differential pressure through the shattered metal pre-filter was 115 psi.

The running time for pre-filters is normally 75 to 85 hours at which time the differential pressure begins to increase exponentially. At this time, the pre-filters are replaced with clean filters. The shattered metal filter averaged 14 hours less than the standard pre-filter.

Extrusion quality is measured by draw twister performance where filament breaks are not allowed in the finished yarn package. When filament breaks are observed, the package is "short doffed" and the resulting yarn is scrapped. For some polymers, this waste would average 9%. With clear Nylon 6 polymers that are subsequently dyed, the waste may be as low as 4.65%. These figures can be expressed in a more commonly used 0.15 to 0.30 breaks per pound of production.

Use of the shattered metal pre-filter device reduced waste to zero on all three test runs.

FIG. 4 illustrates a plot of the differential pressure readings against running time of the pre-filters. The initial rise in pressure in the shattered metal pre-filter appears to be due to a wetting out of the shattered metal.

The construction of the pre-filter device is such that the filter assembly 21 can be removed from the housing 19. Further, the construction of the filter assembly 21 is such that it can be readily dismantled for cleaning purposes. For example, after removal from the housing 19, the plug 36 is unthreaded so that the mass of 26 of shattered metal particles can be emptied. Should the mass be agglomerated within the cavity 25, the assembly 21 can be heated to melt and carbonize the polymer trapped within the mass so that the particles can be subsequently emptied from the assembly 21. After removal of the plug 36 and shattered metal mass 26, the fitting 43 can be unthreaded so that the inner filter elements 27, 28, 29 are removed. The sleeves 22, 23, 24 can then be cleaned in a suitable manner independently of the cleaning of the filter elements 27, 28, 29.

The invention thus provides a pre-filter device which can be used to efficiently filter a polymeric filter which is subsequently used to make multi-filament thread.

The invention further provides a pre-filter device which permits polymeric material to be made into multi-filament thread with little or no breakage during the life of the pre-filter device.

The pre-filter assembly thus permits an increased production of long strand high quality fibers per pound of melt, a longer filter life with attendant reduced down-time and ease of cleaning.

Further, the invention provides a filter assembly which can be readily disassembled for maintenance purposes. Still further, the invention provides a filter assembly which is capable of a relatively long life.

Further, the invention provides a filter assembly wherein the inner filter elements may have a limited area and/or low velocity without suffering from "blinding" due to gels or other polymer anomalies. This results in an increased production of long strand high quality fibers per pound of melt, longer filter life with reduced down-time and ease of cleaning.

Still further, by virtue of the reduction of gel "blinding", the period between cleaning of the filter elements by pyrolysis or other means is extended. This, in turn, extends the useful filter element life which tends to be reduced by repeated cleaning.

Further, the invention provides a basic chamber into which the particulate may be easily changed or tailored for specific filtration effects without the high cost or factory involvement normally experienced thereby providing limitless flexibility in selecting the best filter for the job.

What is claimed is:

1. A filter assembly for polymeric material comprising
    at least one outer tubular porous sleeve for filtering large particulate particles from a polymeric material passing therethrough, said sleeve defining a chamber to receive the filtered polymeric material;
    a mass of loose shattered metal particles in said chamber to filter micro-gels from the polymeric material passing therethrough while providing high shear for polymer anomalies; and
    at least one low velocity filter element within said chamber and said mass of shattered metal particles to support said shattered metal particles and to filter out fine particulate matter from the polymeric material passing therethrough, said filter element defining an outlet passage for the filtered polymeric material.

2. A filter assembly as set forth in claim 1 further comprising
    a first end cap secured to said sleeve at one end thereof to close said chamber thereat; and
    a plug removably mounted in said first end cap to permit filling and emptying of said shattered metal particles into and out of said chamber.

3. A filter assembly as set forth in claim 2 further comprising
    a second end cap secured to said sleeve at an opposite end thereof to close said chamber thereat; and
    a fitting removably mounted in said second end cap and secured to said inner tubular filter element to permit removal of said filter element from said chamber.

4. A filter assembly as set forth in claim 1 which further comprises at least two concentric and contiguous sleeves defining said chamber, one of said sleeves being a wire mesh screen and another of said sleeves being a perforated tube to retain said wire mesh screen.

5. A filter assembly as set forth in claim 1 which further comprises at least two concentric and contiguous tubular filter elements within said chamber, one of said filter elements being a wire mesh screen and another of said filter elements being a porous tube for supporting said wire mesh screen.

6. A filter assembly as set forth in claim 5 wherein said tube is a wedge wire tube.

7. A filter assembly as set forth in claim 1 wherein said shattered metal particles are sized to shear individual streams of the polymeric material following therethrough into a multiplicity of branch streams for breaking down polymer gels in the individual streams.

8. A filter assembly for polymeric material comprising
    at least one porous sleeve for filtering large particulate particles from a polymeric material passing transversely therethrough, said sleeve defining a chamber to receive the filtered polymeric material;
    a mass of shattered metal particles in said chamber to filter micro-gels from the polymeric material passing therethrough, said shattered metal particles being sized to shear the polymeric material into a multiplicity of branched streams for breaking down polymer gels; and
    at least one inner tubular low velocity filter element within said chamber and mass of shattered metal particles to support said mass and to filter out particulate matter from the polymeric material passing therethrough, said filter element defining an outlet passage for the filtered polymeric material.

9. A filter assembly as set forth in claim 8 further comprising
    A first end cap secured to said sleeve at one end thereof to close said chamber thereat; and
    a second end cap secured to said sleeve at an opposite end thereof to close said chamber thereat; and
    a plug removably mounted in said first end cap to permit filling and emptying of said shattered metal particles into and out of said chamber; and
    a fitting removably mounted in said second end cap and secured to said inner tubular filter element to permit removal of said filter element from said chamber.

10. A pre-filter device for a molten ploymeric material comprising
    a housing having a cavity and an inlet for introduction of a polymeric material into said cavity; and
    a filter assembly removably mounted in said housing within said cavity, said assembly including at least one outer tubular porous sleeve defining a chamber for passage of molten polymeric material therethrough and sized to filter large particulate particles from the molten material, a mass of loose shattered metal particles in said chamber to filter micro-gels from the polymeric material passing therethrough while providing high shear for polymer anomalies, at least one low velocity inner tubular filter element within said chamber and said mass of shattered metal particles to support said shattered metal particles and to filter out fine particulate matter from the polymeric material passing therethrough, and means defining an outlet communicating with said inner filter to deliver filtered polymeric material therethrough.

11. A pre-filter device as set forth in claim 10 wherein said inner filter element is concentric with said outer sleeve.

12. A pre-filter device as set forth in claim 10 wherein said filter assembly includes a pair of caps secured at respective ends of said outer sleeve, at least one of said caps having a closeable opening for introduction of and removal of said shattered metal particles to and from said chamber.

13. A filter assembly for polymeric material comprising at least one outer tubular porous sleeve for filtering a polymeric material passing therethrough, said sleeve defining a chamber to receive the filtered polymeric material;

a mass of loose shattered metal particles in said chamber to filter the polymeric material passing therethrough while providing high shear for polymer anomalies;

at least one filter element within said chamber and said mass of shattered metal particles to support said shattered metal particles and to filter out fine particulate matter from the polymeric material passing therethrough, said filter element defining an outlet passage for the filtered polymeric material and having a recess at a free end thereof within said chamber;

a first end cap secured to said sleeve at one end thereof to close said chamber thereat;

a plug removably mounted in said first end cap to permit filling and emptying of said shattered metal particles into and out of said chamber, said plug including a protuberance thereon received in said recess for centering said filter element;

a second end cap secured to said sleeve at an opposite end thereof to close said chamber thereat; and a fitting removably mounted in said second end cap.

14. A filter assembly for polymeric material comprising at least one outer tubular porous sleeve for filtering a polymeric material passing therethrough, said sleeve defining a chamber to receive the filtered polymeric material;

a mass of loose shattered metal particles in said chamber to filter the polymeric material passing therethrough while providing high shear for polymer anomalies; and at least two concentric and contiguous tubular filter elements within said chamber and said mass of shattered metal particles to support said shattered metal particles and to filter out fine particulate from the polymeric material passing therethrough, said filter element defining an outlet passage for the filtered polymeric material, one of said filter elements being a wire mesh screen and another of said filter elements being a porous sintered tube for supporting said wire mesh screen.

* * * * *